United States Patent [19]

Hunter

[11] Patent Number: 5,028,230
[45] Date of Patent: Jul. 2, 1991

[54] MACHINE FOR HANDLING MOLDS IN INJECTION MOLDING

[75] Inventor: Gordon S. Hunter, Auckland, New Zealand

[73] Assignee: Fisher & Paykel Limited, Auckland, New Zealand

[21] Appl. No.: 497,024

[22] Filed: Mar. 22, 1990

[30] Foreign Application Priority Data

Mar. 23, 1989 [NZ] New Zealand .................. 228470

[51] Int. Cl.⁵ .................................... B29C 45/64
[52] U.S. Cl. ........................ 425/576; 264/328.11; 425/409; 425/DIG. 116
[58] Field of Search .............. 425/225, 409, 411, 418, 425/442, 543, 574, 575, 576, DIG. 16; 264/328.2, 328.11

[56] References Cited

U.S. PATENT DOCUMENTS

| | | | |
|---|---|---|---|
| 3,981,671 | 9/1976 | Edwards | 425/543 |
| 4,007,679 | 2/1977 | Edwards | 425/409 |
| 4,082,492 | 4/1978 | Kurreck | 425/451 |
| 4,191,523 | 3/1980 | Niederst et al. | 425/589 |
| 4,708,625 | 11/1987 | Arend | 425/411 |

*Primary Examiner*—Timothy Heitbrink
*Attorney, Agent, or Firm*—Fleit, Jacobson, Cohn, Price, Holman & Stern

[57] ABSTRACT

Production machinery for handling plastics injection mold parts up-ended has a pair of article manipulating devices having article attachment faces to which mold parts are attachable. One of the pair is translatably movable to move the mold parts clear of each other and the attachment faces are associated with slewing rings at an angle, e.g. 45°, to the attachment faces to enable the mold parts to be turned from a working disposition to a cleaning, repair, or other disposition.

15 Claims, 2 Drawing Sheets

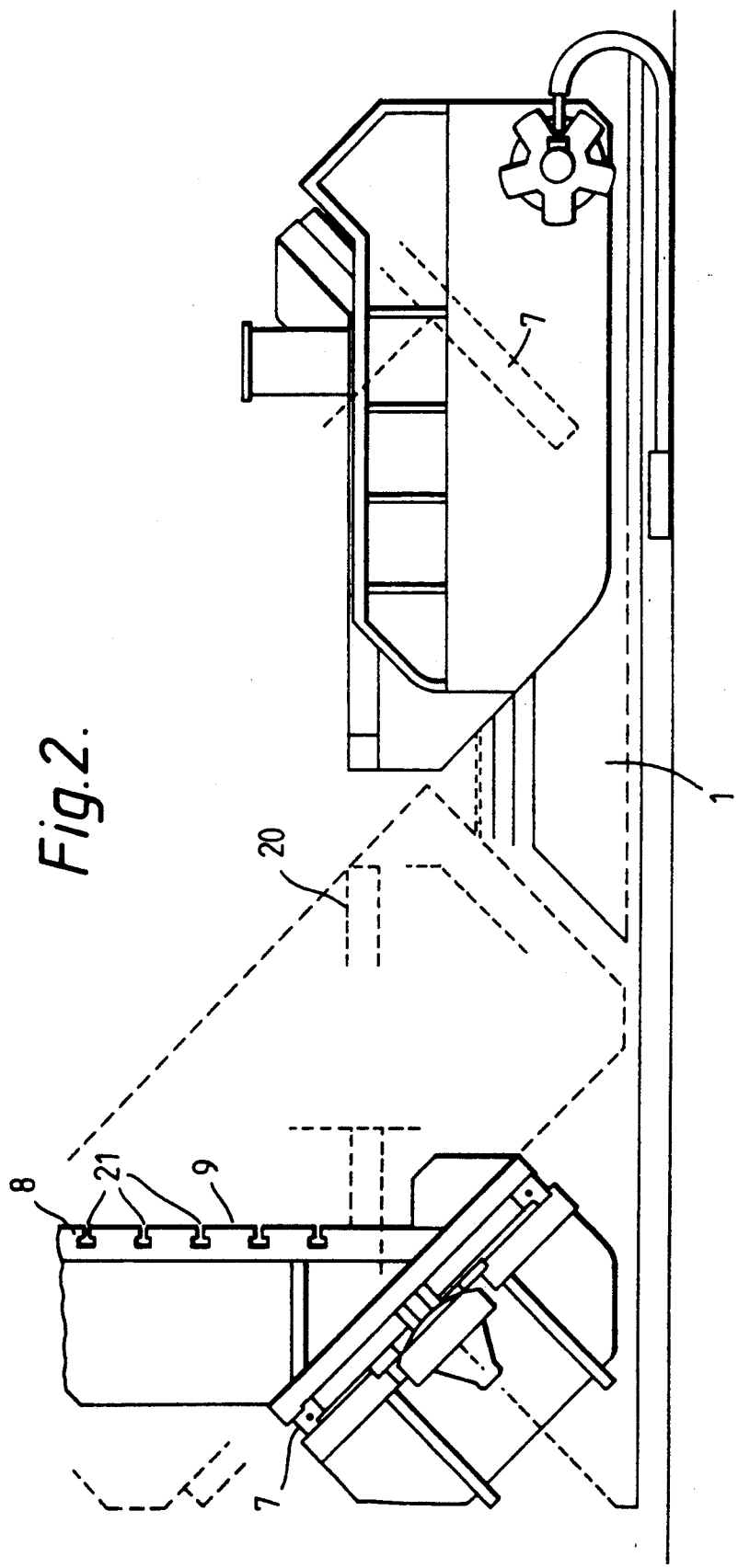

MACHINE FOR HANDLING MOLDS IN INJECTION MOLDING

FIELD OF THE INVENTION

This invention relates to production machinery and has been devised particularly though not solely for use in handling moulds used in injection molding machines.

BRIEF SUMMARY OF THE INVENTION

It is an object of the present invention to provide production machinery for handling molds used in injection molding.

Accordingly the invention consists in production machinery comprising article manipulating apparatus, said apparatus including a base frame having a horizontal longitudinal main plane and a transverse axis and at least one article manipulating means to enable an article placed thereon to be moved from a first orientation to a second orientation, each article manipulating means comprising a transverse mounting plate on the base frame, at a selected angle to the horizontal plane, a rotatable slewing ring on the mounting plate, a first article attaching means on the slewing ring and having an article attaching surface to enable an article to be attached thereto at a further angle to the mounting plate, so that rotation of the slewing ring rotates the article attaching surface and an article fixed thereto causing the article attaching surface to be movable from the first orientation in which the article attaching surface is in one plane relative to the main plane to the second orientation in which the article attaching face is in a different plane relative to the main plane.

The invention also envisages constructions of which the following gives examples only.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described in detail with reference to the accompanying drawings wherein;

FIG. 2 is a diagramatic cross-sectional view of the machine shown in FIG. 1.

DETAILED DESCRIPTION

Figure 1:
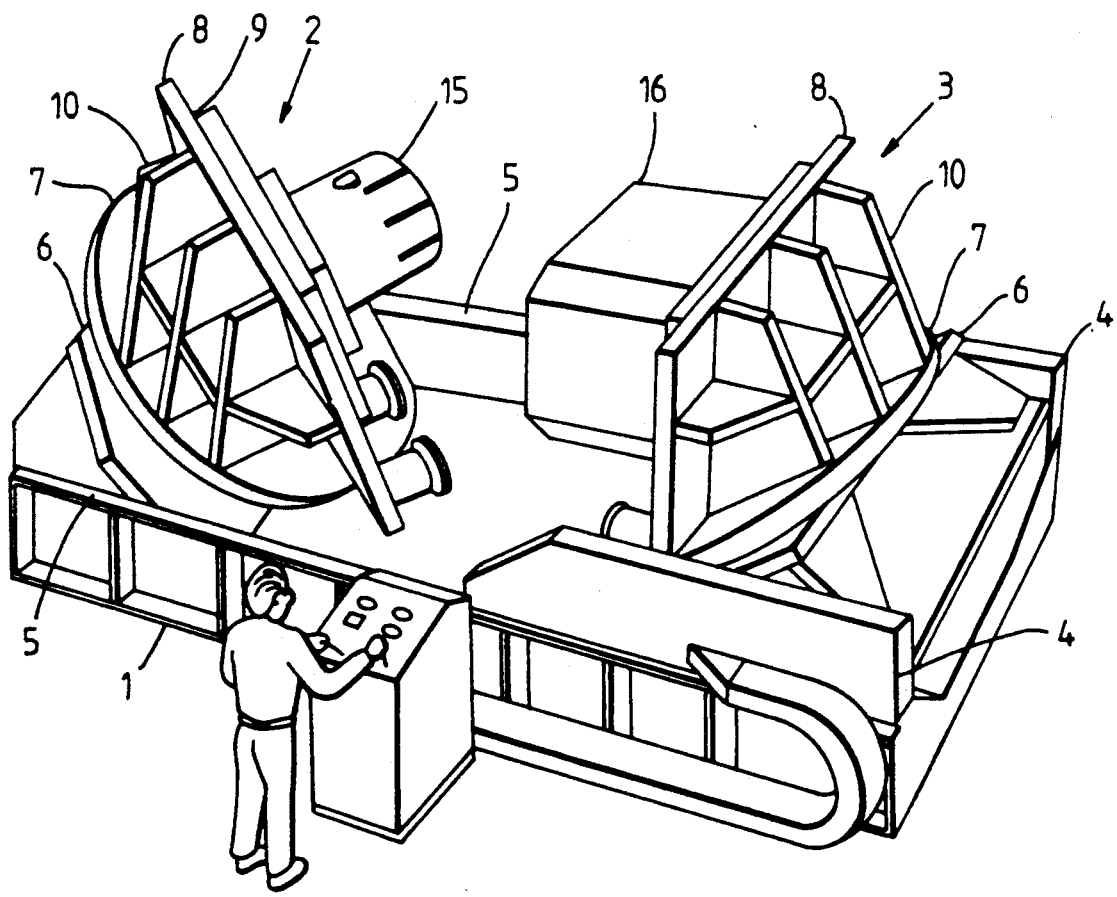
FIG. 1 is a perspective view of a production machine in the form of a mold manipulating machine constructed according to the invention.

Referring to the drawings, production machinery in the form of an article manipulating machine, the article being two parts of a plastics injection mold, includes a base frame 1 on which one, and preferably two, mold manipulating devices are provided. One such device generally shown at 2 may be fixed to the base frame and the other device generally shown at 3 is mounted on carriages or runners 4 which enable the device 3 to be movable on tracks 5 on the base frame 1. The device 3 is preferably moveable by hydraulic means (not shown) and runs with wheels or rollers (not shown) operating on the tracks 5.

Each device 2 and 3 has a mounting plate 6 arranged at an angle of preferably 45° to the plane of the tracks 5 and mounted on each of these plates 6 and parallel thereto is a slewing ring 7 on which is mounted a mold attaching means 8 having a mold part attaching face 9. It is envisaged that the mold attaching means will enable molds of a weight of for example 15 tons to be handled and accordingly the mold attaching means 8 are reinforced with suitable reinforcings 10 or otherwise made structurally strong enough to support the mold parts.

In FIG. 1 an internal plastics injection mold part 15 is shown which fits within an external plastics injection mold part 16 in the known way. The slewing rings 7 are arranged to be rotated by any suitable means such as an electric or hydraulic motor (not shown) and operate to rotate mold parts 15 and 16. For example in FIG. 1, the mold part 16 is showm in its working disposition whereas the mold part 15 is shown partly slewed between its working position and an operating position shown in dash lines at 20 in FIG. 2.

In use the production machine above described is placed along side an injection molding machine and the mold parts 15 and 16 in the assembled disposition are detached from the injection molding machine, moved on a conveyor or roller system (not shown) to a point where the respective parts may be fixed, e.g. using bolts and the Tee Slots 21 (FIG. 2) to the mold part attachment faces 9, which are arranged in the vertical disposition. The moveable device 3 and its mounted mold part are then moved by appropriate hydraulic means to separate the mold parts. Each device may then be rotated on its slewing ring 7 until the face 9 thereof is in a horizontal disposition, the slewing ring 7 having been rotated through 180°. Thus by rotating the slewing rings 7 each of the mold part attachment faces 9 of the mold attachment means 8 are moved from a vertical disposition, as shown in FIG. 1 at the right hand end and FIG. 2 at the left hand end, to a horizontal disposition in which the mold part attachment faces 9 of the mold attaching means 8 are substantially horizontal. With the mold parts 15 and 16 in this position such parts are at a convenience working level to enable cleaning, repair and other work to be carried out on the mold parts in a convenient maintenance disposition.

The apparatus may be used as a further example, in foundries for the handling of casting equipment such as molding flasks, core boxes, pattern plates and other equipment requiring exposure separately and assembly together in different dispositions.

From the foregoing it will be seen that a simple but robust piece of machinery is provided which will enable mold parts to be bolted to the mold attachment means with mold parts still in the assembled disposition, the moveable member then being moved to separate the mold parts, then turned on the slewing rings one at a time to convert the mold parts from a working position to a position where operations may be readily carried out thereon. The advantages of this are therefore considerable.

What is claim is:

1. Production machinery comprising:
   a base frame having a horizontal longitudinal main plane and a transverse axis; and
   at least one article manipulating means to enable an article supported thereon to be moved from a first orientation to a second orientation, said at least one article manipulating means comprising a transverse mounting plate mounted on said base frame in a plane at a selected angle to said horizontal plane, a slewing ring rotatably mounted on said mounting plate, and an article attaching means on said slewing ring for rotation therewith, said article attaching means and having an article attaching surface thereon for attaching an article thereto at a further angle to said mounting plate;

so that rotation of said slewing ring rotates said article attaching surface and said article fixed thereto causing said article attaching surface to be movable from said first orientation in which said article attaching surface is in one plane relative to said main plane to said second orientation in which said article attaching surface is in a different plane relative to said main plane.

2. Production machinery as claimed in claim 1 wherein:
said article comprises a plastics injection mold.

3. Production machinery as claimed in claim 1 wherein:
a pair of article manipulating means is provided, one of said pair being translatably movable relative to the other of said pair to provide clearance between articles attached to respective article attaching surfaces of said pair during article manipulation.

4. Production machinery as claimed in claim 2 wherein:
a pair of article manipulating means is provided, one of said pair being translatably movable relative to the other of said pair to provide clearance between articles attached to respective article attaching surfaces of said pair during article manipulation.

5. Production machinery as claimed in claim 3 wherein:
said one of said article manipulating means is translatably movable to free an article on said article attaching surface of one of said pair of article manipulating means from an article on said article attaching surface of the other of said pair.

6. Production machinery as claimed in claim 1 wherein:
said mounting plate is arranged at a selected angle so that said article mounted on said article attaching surface is rotatable through at least 90° of angular movement relative to said main plane.

7. Production machinery as claimed in claim 2 wherein:
said mounting plate is arranged at a selected angle so that an article mounted on said article attaching surface is rotatable through at least 90° of angular movement relative to said main plane.

8. Production machinery as claimed in claim 3 wherein:
said mounting plate is arranged at a selected angle so that an article mounted on said article attaching surface is rotatable through at least 90° of angular movement relative to said main plane.

9. Production machinery as claimed in claim 4 wherein:
said mounting plate is arranged at a selected angle so that an article mounted on said article attaching surface is rotatable through at least 90° of angular movement relative to said main plane.

10. Production machinery as claimed in claim 5 wherein:
said mounting plate is arranged at a selected angle so that an article mounted on said article attaching surface is rotatable through at least 90° of angular movement relative to said main plane.

11. Production machinery as claimed in claim 6 wherein: said slewing ring and article attaching surface are arranged at an angle of substantially 45° with respect to each other.

12. Production machinery as claimed in claim 3 wherein:
each slewing ring and article attaching surface are arranged at an angle of substantially 45° with respect to each other.

13. Production machinery as claimed in claim 5 wherein:
each slewing ring and article attaching surface are arranged at an angle of substantially 45° with respect to each other.

14. Production machinery as claimed in claim 6 wherein:
said slewing ring and said article attaching surface are arranged at an angle of substantially 45° with respect to each other.

15. Production machinery as claimed in claim 10 wherein:
each slewing ring and article attaching surface are arranged at an angle of substantially 45° with respect to each other.

* * * * *